US009121721B2

(12) United States Patent  
Lange et al.

(10) Patent No.: US 9,121,721 B2  
(45) Date of Patent: Sep. 1, 2015

(54) NAVIGATION METHOD AND NAVIGATION DEVICE

(71) Applicant: Bayerische Motoren Werke Aktiengesellschaft, Munich (DE)

(72) Inventors: Tim Lange, Glen Rock, NJ (US); Markus Gassner, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 20 days.

(21) Appl. No.: 14/175,202

(22) Filed: Feb. 7, 2014

(65) Prior Publication Data

US 2014/0156185 A1 Jun. 5, 2014

Related U.S. Application Data

(63) Continuation of application No. PCT/EP2012/065384, filed on Aug. 7, 2012.

(30) Foreign Application Priority Data

Aug. 10, 2011 (DE) .......................... 10 2011 080 758

(51) Int. Cl.
*G01C 21/10* (2006.01)
*G01C 21/34* (2006.01)
(Continued)

(52) U.S. Cl.
CPC ............ *G01C 21/3469* (2013.01); *G01C 21/34* (2013.01); *G01C 21/36* (2013.01); *G05D 1/02* (2013.01); *G06F 19/00* (2013.01); *G08G 1/00* (2013.01)

(58) Field of Classification Search
CPC .............. G05D 1/02; G05D 3/00; B60L 3/00; B60L 13/04; B60L 13/00; G01C 21/34; G01C 21/36; F02D 28/00
See application file for complete search history.

(56) References Cited

U.S. PATENT DOCUMENTS 5,913,917 A 6/1999 Murphy
6,314,347 B1 11/2001 Kuroda et al.
(Continued)

FOREIGN PATENT DOCUMENTS

DE 10 2004 010 870 A1 9/2004
DE 10 2007 059 120 A1 6/2009
(Continued)

OTHER PUBLICATIONS

International Preliminary Report on Patentability dated Feb. 11, 2014 (Eight (8) pages).
(Continued)

*Primary Examiner* — Behrang Badii
(74) *Attorney, Agent, or Firm* — Crowell & Moring LLP (57) ABSTRACT

In a navigation method, at least one constant travel characteristic (CONST_KW) is determined that is representative of a vehicle-specific energy requirement with respect to a predetermined trip length at quasi-constant speed and on a quasi-level stretch. At least one dynamic characteristic (DYN_KW) is determined that is representative of a vehicle-specific energy requirement with respect to a predetermined trip length at quasi-dynamic speed and on a quasi-level stretch. The constant travel characteristic (CONST_KW) is respectively adapted on the basis of at least one vehicle-specifically determined energy consumption characteristic (EV_KW) for a traveled route segment that has been recognized as quasi-level and in which a quasi-constant speed was detected. To determine an expected energy requirement for a predetermined driving route (RT) with several route segments (STA), the individual route segments (STA) are each made available either as a constant travel segment (CONST_STA) or as a dynamic travel segment (DYN_STA). For each route segment (STA), the estimated route segment energy requirement characteristic (ST_EB_KW) is determined on the basis of a respective constant travel characteristic (CONST_KW) in the event of a route segment (STA) made available as a constant travel segment (CONST_STA) and on the basis of a respective dynamic characteristic (DYN_KW) in the event of a route segment made available as a dynamic travel segment. An estimated route energy requirement characteristic (RT_EB_KW) for the predetermined driving route (RT) is determined on the basis of the respective route segment energy requirement characteristics (ST_EB_KW).

35 Claims, 6 Drawing Sheets

(51) Int. Cl.
  *G05D 1/02* (2006.01)
  *G01C 21/36* (2006.01)
  *G08G 1/00* (2006.01)
  *G06F 19/00* (2011.01)

(56) References Cited

U.S. PATENT DOCUMENTS

| | | | |
|---|---|---|---|
| 8,290,695 B2* | 10/2012 | Hiestermann et al. | 701/119 |
| 8,712,676 B2* | 4/2014 | Hiestermann et al. | 701/119 |
| 2004/0230376 A1 | 11/2004 | Ichikawa et al. | |
| 2010/0010732 A1 | 1/2010 | Hartman | |
| 2010/0332060 A1* | 12/2010 | Bae et al. | 701/22 |
| 2011/0160993 A1 | 6/2011 | Tsurutani et al. | |
| 2011/0184642 A1* | 7/2011 | Rotz et al. | 701/201 |
| 2011/0307166 A1* | 12/2011 | Hiestermann et al. | 701/119 |
| 2013/0245943 A1* | 9/2013 | Hiestermann et al. | 701/533 |

FOREIGN PATENT DOCUMENTS

| | | |
|---|---|---|
| DE | 10 2009 053 982 A1 | 6/2010 |
| EP | 2 136 182 A1 | 12/2009 |

OTHER PUBLICATIONS

International Search Report (PCT/ISA/210) with English translation thereof dated Jun. 11, 2012 {Four (4) pages}.

German-language Search Report with partial English translation thereof dated Jul. 23, 2012 {Ten (10) pages}.

"Spart ein Navi wirklich Kraftstoff?", (Does a navi[gational system really save fuel?], Auto Motor und Sport, http://www.auto-moto-und-sport.de/testbericht/sparen-navigationsgeraete-wirklich-kraftstoff-1477779.html, downloaded May 31, 2011.

* cited by examiner

NAVIGATION METHOD AND NAVIGATION DEVICE

CROSS REFERENCE TO RELATED APPLICATIONS

This application is a continuation of PCT International Application No. PCT/EP2012/065384, filed Aug. 7, 2012, which claims priority under 35 U.S.C. §119 from German Patent Application No. 10 2011 080 758.6, filed Aug. 10, 2011, the entire disclosures of which are herein expressly incorporated by reference.

BACKGROUND AND SUMMARY OF THE INVENTION

The invention relates to a navigation method and a navigation device. In modern motor vehicles, navigation devices are usually provided. These enable determination of a route between a starting point and a destination point and then route guidance toward the destination point taking into account a currently detected position that is determined regularly by means of a GPS system. The navigation devices are usually designed to determine a route while taking various optimization criteria into account. For instance, a provision can be made to determine the fastest or shortest route between the starting point and the destination point, or also to determine a route that preferably has a certain type of road, such as highways, for example, or to determine a route that particularly has toll-free stretches. Increasingly, it is also desired to take the expected energy requirement into account when determining a driving route.

For instance, from the article "Spart ein Navi wirklich Kraftstoff?" ["Does a navi[gational system really save fuel?"], Auto Motor and Sport, http:www.auto-motor-und-sport.de/testbericht/sparen-navigationsgeraete-wirklich-kraftstoff-1477779.html, downloaded on May 31, 2011, it is known to determine a most efficient route. A description is given in the article of taking into account whether the respective vehicle is equipped with a start-stop or hybrid system. One consequence of this may then be that the driver is more likely piloted through the city in this case than with a car in which the engine continues to run at red lights. Moreover, it is also explained in the above-mentioned article that mountains increase energy consumption far less in a hybrid model, since energy is recovered during descents, whereas a conventional combustion engine should run as uniformly as possible on level ground. It is also explained in the above-mentioned article that current systems are only capable of making a compromise between the length of the route and the driving time. Differences in altitude are not yet taken into account.

It is one object of the invention to provide a navigation method and navigation device that make a contribution to precisely detecting the expected energy requirement for a predetermined route.

It is another object of the invention to provide a navigation method and a navigation device that make a contribution to determining a route taking into account a precise expected energy requirement.

This and other objects are achieved according to a first aspect of the invention by a navigation method in which a constant travel characteristic is determined that is representative of a vehicle-specific energy requirement with respect to a predetermined trip length and quasi-constant speed, particularly constant speed, on a quasi-level route, particularly a level route. The reference to the predetermined trip length can be a reference per meter or kilometer driven, for example.

Furthermore, at least one dynamic characteristic is determined that is representative of a vehicle-specific energy requirement with respect to a predetermined trip length at a predetermined quasi-dynamic speed, particularly a dynamic speed, on a quasi-level route, particularly a level route.

The constant travel characteristic is adapted in each case depending on at least one vehicle-specifically determined energy requirement characteristic for a traveled route segment that has been recognized as being quasi-level and in which a quasi-constant speed has been recognized.

The energy consumption characteristic can be determined, for example, on the basis of a metered quantity of fuel determined on the respectively traveled route segment and/or on the basis of a required electrical power determined for the traveled route segment.

In this context, in order to determine the expected energy requirement for a predetermined route for each route segment, an estimated segment energy requirement characteristic is determined based on a respective constant travel characteristic that is associated with the respective route segment and, in the event that one or more dynamic events are associated with the respective route segment, for each dynamic event depending on a respective dynamic characteristic.

An estimated route energy requirement characteristic for the predetermined route is determined based on the respective segment energy requirement characteristics.

In particular, the insight is exploited in this context that dynamic events are responsible to a great extent for overconsumption compared to assumed constant travel. Beyond that, however, an energy profile during travel is vehicle-specific and differs.

Optionally, the dynamic characteristic is adapted in each case based on at least one energy consumption characteristic determined on a vehicle-specific basis for a route segment traveled in which at least one predetermined speed dynamic has been detected and was recognized as being quasi-level.

In this context, it is also especially advantageous if the constant travel characteristic and/or the dynamic characteristic is detected and adapted in a driver-specific manner, thus taking into account different behavior of the driver, which can have a substantial impact on the energy requirement.

In this way, the expected vehicle-specific energy requirement can be estimated in an especially precise manner for a respective route.

Besides determining a route between the starting point and the respective destination point with the lowest expected energy requirement for the vehicle, the above procedure also makes it possible to indicate a possible range of the vehicle with respect to fueling and/or charging that might be necessary over the course of the route.

Through the respective adaptation of the respective constant travel characteristic and/or of the respective dynamic characteristic, a learning of the respective characteristics is enabled, and time-related changes that result, for example, from changed driving behavior or a change in a vehicle-specific consumption characteristic can also be taken into account.

According to a second aspect, the invention is characterized by a navigation method for a vehicle in which the detection and adaptation of the at least one constant travel characteristic and of the at least one dynamic characteristic is performed according to the first aspect.

To determine a driving route between a predetermined starting point and a predetermined destination point while taking an expected energy requirement into account, it is determined for each candidate route segment whether one or more dynamic events are associated with it, and an estimated candidate route energy requirement characteristic is also determined for each candidate route segment on the basis of a respective constant travel characteristic that is associated with the respective candidate route segment and, if one or more dynamic events are associated with the respective candidate route segment, for each dynamic event based on a respective dynamic characteristic.

Furthermore, the driving route is determined by selecting the candidate route segments on the basis of the estimated candidate route energy requirement characteristics. The second aspect corresponds to the first aspect in terms of its effects and advantages.

According to an advantageous embodiment of the second aspect, the driving route is determined by selecting the candidate route segments while taking an estimated segment driving time for the respective candidate route segments into account. In this way, the driving route can be determined such that its driving time also lies within a range that is acceptable to the driver.

According to an advantageous embodiment of the second aspect, the driving route is determined by selecting the candidate route segments while taking a vehicle load energy requirement characteristic into account that is determined on the basis of an estimated driving time for the driving route.

The vehicle load energy requirement characteristic is particularly representative of an expected energy requirement of respective vehicle loads, such as vehicle heating and/or air conditioning, for example.

According to an advantageous embodiment of the first aspect, the estimated route energy requirement characteristic is determined on the basis of a vehicle load energy requirement characteristic, which is determined based on an estimated driving time for the driving route.

According to another advantageous embodiment, the vehicle load energy requirement characteristic is determined on the basis of a detected outside temperature.

According to another advantageous embodiment, the constant travel characteristic is respectively determined with respect to one of several predetermined speed classes. The constant travel characteristic of a respective speed class is adapted in each case at a speed lying within the speed class. In this way, it can be ensured in a simple manner that, if the speed classes are selected appropriately, adaptation takes place with sufficient frequency, making it possible for the respective constant travel characteristic to be learned as precisely as possible. On the other hand, this ensures that different characteristics can be taken into account for different speed classes.

According to another advantageous embodiment, the dynamic characteristic is determined in each case with respect to one of several predetermined speed change classes. The dynamic characteristic of a respective speed change class is adapted in each case with a speed change that lies within the speed change class.

In this way, it can also be ensured that, if the speed change classes are selected appropriately, the respective dynamic characteristic is adapted with sufficient frequency, thus enabling good learning thereof. Moreover, a different characteristic can be taken into account here as well with respect to the respective speed change class.

What is more, this is based on the insight that, particularly with differing speed change classes, which is to say different speed change ranges, another characteristic of the energy requirement to be expected is regularly present.

According to another advantageous embodiment, the dynamic characteristic is adapted and detected separately in each case for a positive and a negative acceleration, the dynamic characteristic for the positive and negative acceleration each being adapted in the case of a positive or negative acceleration, respectively.

In particular, the different influences on the energy requirement in the event of positive acceleration and also in the event of negative acceleration, which is to say during braking in particular, can be precisely taken into account in this way.

According to another advantageous embodiment, the dynamic characteristic is adapted on the basis of the respective constant travel characteristic to the respective speed class under which an average speed expected for the traveled route segment falls. In this way, particularly, an expected increased or reduced energy requirement can be determined with respect to constant travel.

According to an advantageous embodiment of the first aspect, a factor is respectively determined and adapted in order to adapt to a predetermined characteristic that reflects a relationship between speed and energy requirements for the respective speed class. In this context, the energy requirement can represent, for example, the fuel consumption and/or the electrical consumption or the like. The factor particularly represents the respective constant travel characteristic in this context.

In this way, the respective route segment energy requirement characteristic can be determined with particular precision since, on the one hand, the factor is learned for the respective speed class and can therefore be adapted with commensurate frequency, and the respective energy requirement can also be determined in a differentiated manner, represented by the respective characteristic.

According to another advantageous embodiment, the detection of the predetermined dynamic is performed on the basis of a detected change in speed, a detected steering angle, a detected braking pressure, an accelerator pedal position and/or a clutch state. In this way, it is possible to detect the predetermined dynamic in a simple and precise manner, particularly using already existing sensors.

According to another advantageous embodiment, the constant travel characteristic to be associated with the respective route segment or candidate route segment is determined on the basis of an expected average speed for the respective route segment or candidate route segment. The expected average speed can be determined, for example, on the basis of historical measured data for the speed on the respective route segment, or it can also be simply predetermined. In this context, it can also be predetermined, for example, based on the time of day or even based on external information made available to the respective vehicle, such as the current traffic situation.

According to another advantageous embodiment, a respective dynamic event is allocated if an expected change in speed exceeds a predetermined speed change threshold. Moreover, the dynamic characteristic to be allocated for the respective dynamic event is determined based on an expected change in speed during the respective dynamic event.

In this context, it is especially advantageous if the expected change in speed is determined based on an expected turning angle. This is particularly advantageous if digital map information that is made available does not contain any explicit information regarding the expected change in speed for the route segment. In this context, the insight is utilized that the respective expected turning angle correlates with the change in speed to be expected.

According to another advantageous embodiment, the expected change in speed is determined on the basis of a road intersection characteristic. In this way as well, this expected change in speed can be determined quite easily from the road intersection characteristic, which can particularly be derived from the existing map data, particularly in the absence of explicit information on the change in speed to be expected for the respective route segment.

In this context, it is especially advantageous if the road intersection characteristic is determined on the basis of the road types of the intersecting roads, traffic signs at the respective intersection and/or the presence of a traffic light at the respective intersection. In this context, the insight is utilized that, depending on the interplay of the different road types—for example, main road, secondary road, or the like—the change in speed that will occur at the respective intersection can be estimated with a high degree of likelihood. This also applies, accordingly, to the respective traffic signs, such as Yield, Stop, or the like, or the presence or absence of a traffic signal.

According to another advantageous embodiment, the expected change in speed is determined on the basis of a detected curve characteristic.

According to another advantageous embodiment of the first aspect, a grade characteristic is determined for each route segment that is representative of a grade-dependent adjustment of the energy requirement of the vehicle as a function of a predetermined grade for the route segment. For each route segment, the estimated route segment energy requirement characteristic is determined taking the respective grade characteristic into account.

In this way, an increased energy requirement to be expected in the case of a positive grade can be taken into account, and in the case of a negative (or downhill) grade, a reduced energy requirement can be accounted for. Moreover, through the grade-dependent determination of the grade characteristic, it can be ensured that the energy requirement is adjusted to different degrees for different grades. In this context, it can then also be taken into account, for example, that a recuperation of the released potential energy and storage thereof in a vehicle battery is only possible to a reduced extent in the case of an especially pronounced negative grade, since it is expected that the driver will need to apply the brakes more.

It can be especially advantageous in this context if the grade characteristic is respectively predetermined for several grade ranges.

According to another advantageous embodiment of the second aspect, a grade characteristic is determined for each candidate route segment that is representative of a grade-dependent adaptation of the energy requirement of the vehicle as a function of a predetermined grade for the candidate route segment. For each candidate route segment, the estimated candidate route energy requirement characteristic is determined taking the respective grade characteristic into account.

According to another advantageous embodiment, the grade characteristic is adapted in each case as a function of at least one vehicle-specifically determined energy consumption characteristic for a traveled route segment that is recognized as having at least one predetermined grade.

According to another advantageous embodiment, the estimated route energy requirement characteristic is corrected for the predetermined driving route as a function of an engine temperature and a route length. In this way, a warm-up behavior of the engine can be taken into account, particularly when departing in the cold and in the case of a short planned route.

According to a second aspect, a navigation device is provided that is designed to carry out the navigation method according to the first aspect and, in this regard, also with respect to its advantageous designs. In this context, the navigation device particularly includes a data and/or program memory and a processing unit, which particularly comprises a microprocessor. In terms of its advantages and advantageous designs, the second aspect corresponds to the first aspect.

Other objects, advantages and novel features of the present invention will become apparent from the following detailed description of one or more preferred embodiments when considered in conjunction with the accompanying drawings.

DETAILED DESCRIPTION OF THE DRAWINGS

Elements having the same construction or function are designated throughout the figures with the same reference symbols.

Figure 1:
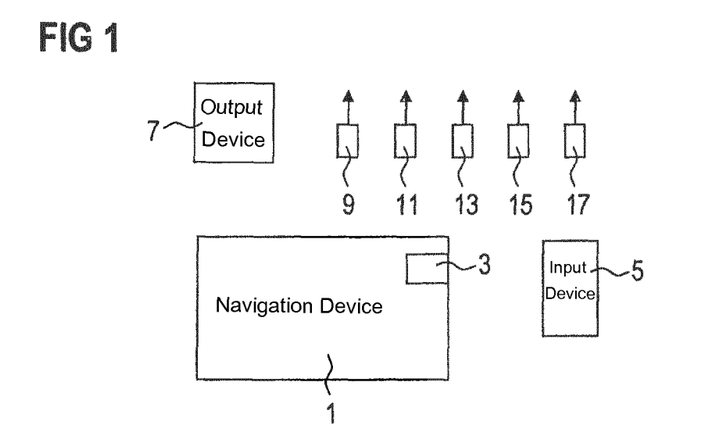
FIG. 1 is a schematic block diagram view of a navigation system with a navigation device 1.

A navigation system has a navigation device 1 with a communication interface 3. The navigation device 1 has a data and program memory and furthermore a processing unit that preferably comprises a microprocessor. Moreover, an input device 5 is associated with the navigation device 1 by which a user, such as a driver of a vehicle, can make inputs into the navigation device 1. The input device 5 can, for example, comprise a rotary push-button, which is also referred to, for example, as an I-controller. Alternatively or in addition, however, it can also comprise a touchscreen and/or an acoustic input unit, for example.

Moreover, an output device 7 is associated with the navigation device 1. The output device 7 is preferably designed for optical signaling. On the output device 7, digital map data, a current position of the vehicle and/or a route is signaled, for example.

Moreover, sensors 9, 11, 13, 15, 17 are associated with the navigation device 1, whose measurement signals are made available to the navigation device 1. For instance, a speed sensor 9, a steering angle sensor 11, a braking pressure sensor 13, an accelerator pedal sensor 15 and a position determination unit 17, which is GPS-based, for example, are provided.

Figure 2:
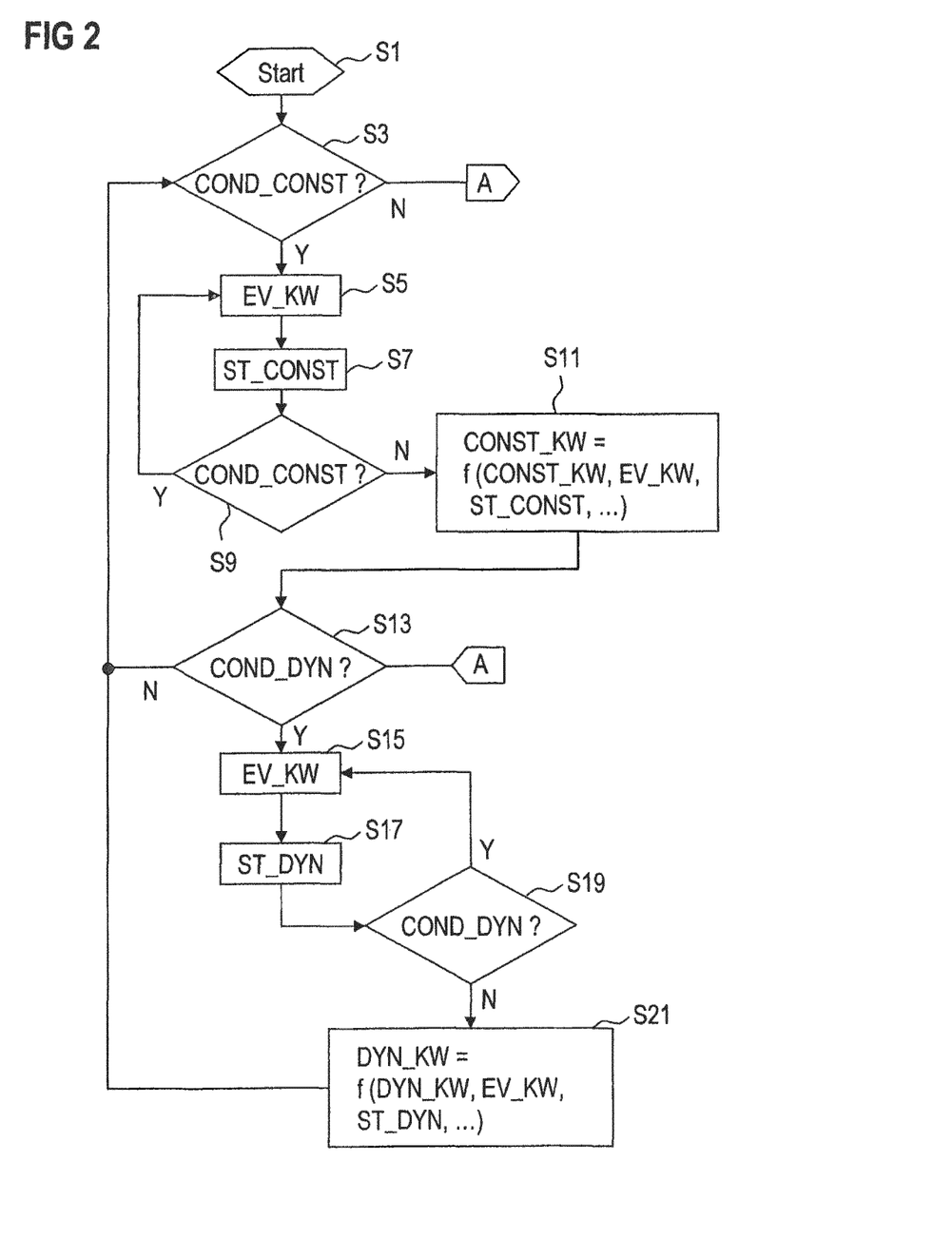
FIG. 2 is a flowchart of a first program that is executed in the navigation device 1.
Figure 3:
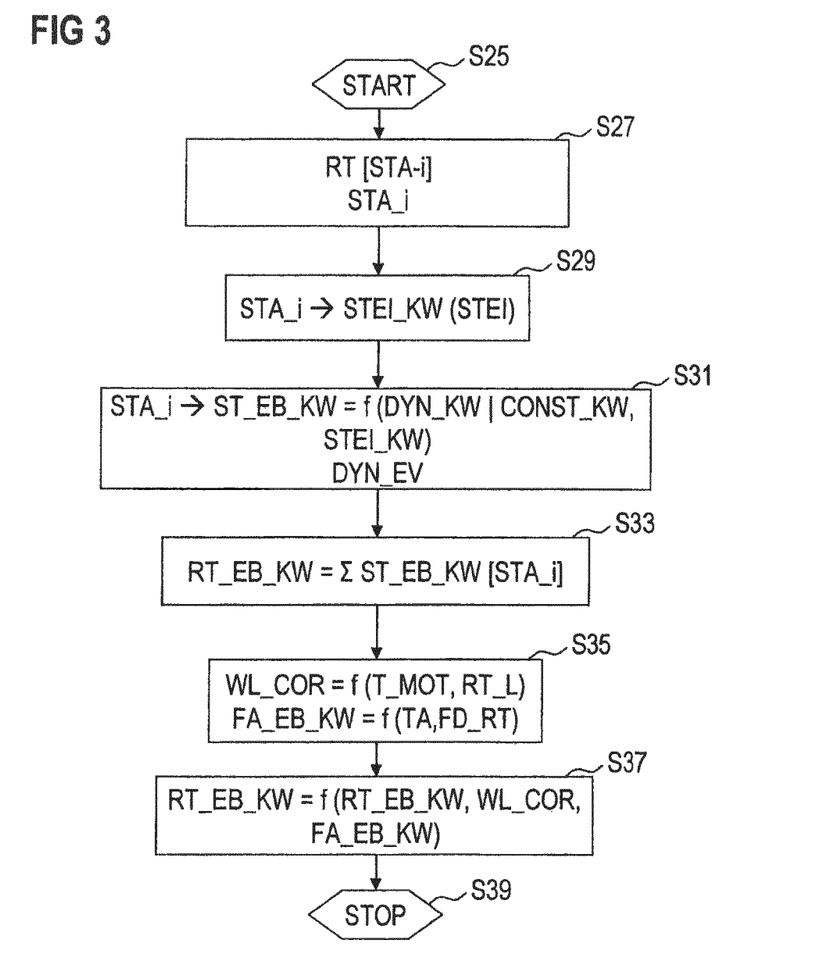
FIG. 3 is a flowchart of a second program that is executed in the navigation device 1.

The programs explained below with reference to FIGS. 2 and 3 are preferably stored in the program memory of the navigation device 1 and are executed in the processing unit during operation of the navigation device 1.

The program according to FIG. 2 is started in a step S1, in which variables can optionally be initialized.

In a step S3, it is checked whether a predetermined condition COND_CONST has been met for a predetermined constant travel mode. The predetermined condition COND_CONST for the predetermined constant travel mode is met, for example, in the event of constant, particularly quasi-constant, speed on a level, particularly quasi-level, stretch. What is understood by quasi-constant speed is particularly that short-term, minor changes in speed are not taken into account which are not indicative of constant travel mode having been discontinued. For this purpose, the individual speed values are appropriately filtered.

A level, particularly quasi-level, stretch can be detected particularly through the analysis of a signal of a tilt sensor or even determined on the basis of information that are associated with a digital road map and stored in the data memory of the navigation device 1. In this context as well, what is meant by a quasi-level stretch is that only short-term changes in the inclination are not taken into account insofar as they are not relevant to a discontinuation of a constant travel mode. Accordingly, filtering can be used to filter out those values that only constitute short-term changes in inclination and that are not relevant to a discontinuation of a constant travel mode.

If the condition of step S3 is met, then the processing is continued in a step S5, in which a vehicle-specific energy consumption characteristic EV_KW initialized immediately with a neutral value before a last execution of step S3 is updated, particularly as a function of the energy consumed by the vehicle since the last time the condition of step S3 was met. For this purpose, for example, the metered quantity of fuel and/or the energy outputted from a battery is determined for an electric power system. Moreover, a segment length ST_CONST that has been traveled since the last time the condition of step S3 is updated accordingly. This is done in a step S7. This segment length, too, is occupied by a neutral value immediately before the execution of step S3.

In a step S9, it is checked whether the predetermined condition COND_CONST continues to be met for the constant travel mode. If this is the case, then steps S5 and S7 are executed again, and the respective vehicle-specific energy consumption characteristic EV_KW and the segment length ST_CONST are updated accordingly.

In contrast, if the condition of step S9 is not met, then a step S11 is executed in which a constant travel characteristic CONST_KW is updated that is representative of a vehicle-specific energy requirement with respect to a predetermined trip length at quasi-constant speed on a quasi-level stretch. The predetermined trip length is a computational reference length and can be 1 m or 100 m or the like, for example.

The adaptation of the constant travel characteristic CONST_KW is done on the basis of the vehicle-specifically determined energy consumption characteristic EV_KW, and on the segment length ST_CONST. For instance, the ratio of the vehicle-specific energy consumption characteristic EV_KW and the segment length ST_CONST can be formed for this purpose. The adjustment can also only be done, for example, if the stretch length ST_CONST exceeds a predetermined minimum value.

Moreover, the adaptation of the constant travel characteristic CONST_KW is preferably done by means of a sliding average and/or with a dynamic attenuation coefficient. In this way, influence can be exerted appropriately particularly on the dynamics of the adaptation. For instance, after an initial calibration of the constant travel characteristic CONST_KW, for example in a new vehicle or in the case of a new driver, a more pronounced adaptation can take place at first and then, for example after a predetermined number of kilometers traveled, say after 1000 km, the intensity of the adaptation can be reduced, which then contributes to more robust learning.

Subsequently to step S11, and also when the condition of step S3 is not met, a step S13 is executed in which it is checked whether a predetermined condition COND_DYN for a dynamic travel mode of the vehicle is met. The predetermined condition COND_DYN is preferably met if at least one predetermined dynamic of the speed has been detected. In this context, a check is therefore performed for a change in the detected speed. In addition, a respective accelerator pedal position, which can also be designated as an angle of the accelerator pedal, can also be analyzed, and/or a detected braking pressure can be determined. Furthermore, a detected steering angle can also be taken into account in this context, since it can be assumed at a steering angle that is representative for a tight curve or a turning operation that the vehicle is in dynamic travel mode.

The above remark regarding quasi-constant speed on a quasi-level stretch also applies analogously to the predetermined quasi-dynamic speed on a quasi-level stretch.

If the condition of step S13 is not met, then execution in step S3 is continued. In contrast, if the condition of step S13 is met, then execution is continued in a step S15, in which the vehicle-specific energy consumption characteristic EV_KW, which was initialized with a neutral value immediately before the last time step S13 was executed, is updated again, particularly with respect to the last time the condition of step S13 was met. Next, it is checked in a step S19 whether the condition COND_DYN for the dynamic travel mode of the vehicle continues to be met. If the condition of step S19 is met, then the execution is again continued in steps S15 and S17.

In contrast, if the condition of step S19 is not met, then a dynamic characteristic DYN_KW is adapted in a step S21 that is representative of the vehicle-specific energy requirement with respect to the predetermined trip length at quasi-dynamic speed on a quasi-level stretch.

The adaptation of the dynamic characteristic DYN_KW in step S21 is done as a function of the vehicle-specific energy consumption characteristic EV_KW and the segment length ST_DYN, for instance based on a ratio formed between the vehicle-specific energy consumption characteristic EV_KW and the segment length ST_DYN. Here, the adaptation is done using a procedure analogous to that which was explained using step S11.

Upon conclusion of step S21, step S3 is executed again.

Preferably, the steps of the program are executed only after the engine has warmed up.

Moreover, the constant travel characteristic CONST_KW and/or the dynamic characteristic DYN_KW is optionally adapted driver-specifically. In this context, the respective driver must be identified accordingly, which can be done using a commensurate vehicle key recognition system, for example.

Moreover, the constant travel characteristic CONST_KW can optionally be adapted, each individually, to various predetermined speed classes. In this context, the condition COND_CONST is then adapted in each case for the respective speed class. The speed classes can also be referred to as speed ranges and be subdivided, for example, into 1 to 15 km/h, 15 to 30 km/h, 30 to 45 km/h, etc.

Moreover, the dynamic characteristic DYN_KW can each also exist with respect to one of several predetermined speed change classes and be adapted appropriately. In this context, the condition COND_DYN is then adapted appropriately for dynamic travel mode in steps S13 and S19 for the respective speed change class, particularly such that, in step S21, the dynamic characteristic DYN_KW is then adapted to the respective speed change class in the event of a speed change within the speed change class. The speed change class can also be referred to as a speed change range and can be predetermined, for example, as a speed change from 15 to 20 km/h, 20 to 30 km/h, 30 to 50 km/h, and greater than 50 km/h.

Optionally, the dynamic characteristic DYN_KW can also be adapted separately in each case for a positive and negative acceleration. In this context, the detected braking pressure as well as the accelerator pedal position are particularly also analyzed for the condition for dynamic travel mode COND_DYN in step S13.

Moreover, the dynamic characteristic DYN_KW is optionally adapted on the basis of the respective constant travel characteristic CONST_KW of the respective speed change class under which the expected average speed falls for a segment that is traveled through between the fulfillment of the condition S13 and a subsequent non-fulfillment of the condition of step S19. In this way, expected energy consumption can be deducted for constant travel mode for the respective segment, thus enabling precise determination of just the differential energy consumption resulting from the positive or negative acceleration.

Figure 5:
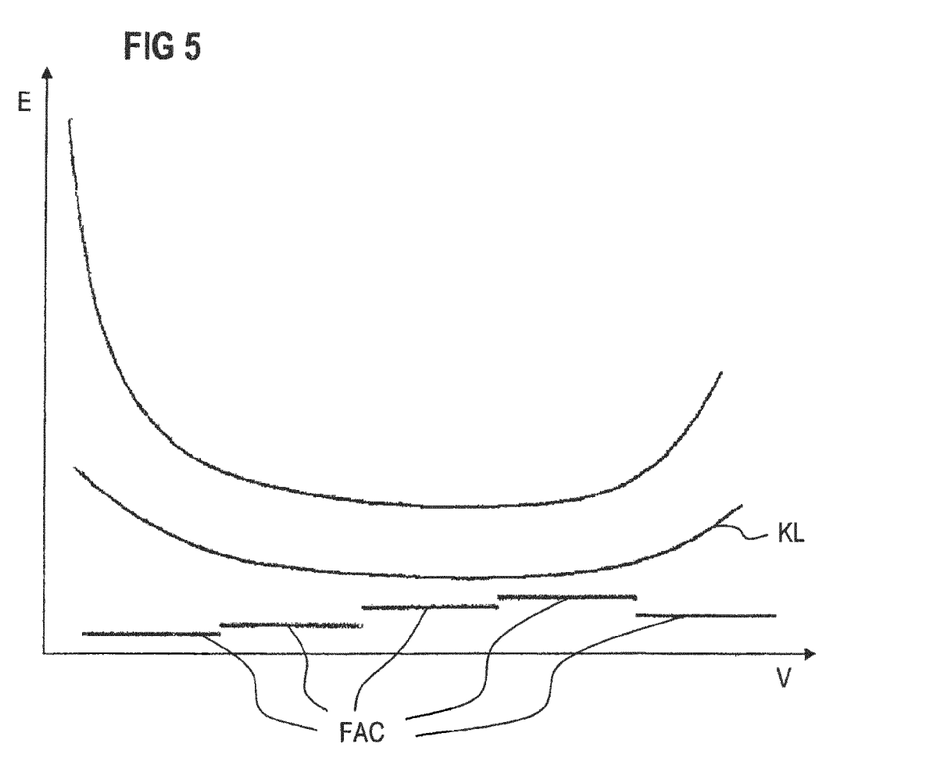
FIG. 5 is a graph illustrating a characteristic and respective factors plotted over a speed.

Moreover, a factor FAC (see FIG. 5) can also be detected in step S11 that adapts a characteristic KL, which is stored, for example, in the data memory for all vehicles of the respective type, to the actual energy requirement, particularly using the vehicle-specifically determined energy consumption characteristic EV_KW and the segment length ST_CONST.

Another program is started in a step S25 in which variables can optionally be initialized.

In a step S27, a predetermined route RT is prepared. The route RT can be determined otherwise, for example, on the basis of a predetermined starting point and a predetermined destination point. The driving route RT is composed of several route segments STA, with "_i" representing an index of the respective route segment STA.

In a step S29, a grade characteristic STEI_KW is determined for each route segment STA that is representative of a grade-dependent adaptation of the energy requirement of the vehicle based on a predetermined grade STEI for the route segment STA. Preferably, commensurate information pertaining to the grade STEI for the respective route segments STA is associated with the respective digital map information that is stored in the data memory. During the determination of the grade characteristic STEI_KW, in addition to the grade STEI, the respective length of the route segment STA can also be taken into account. The grade characteristic STEI_KW preferably takes the respective mass of the vehicle and/or an efficiency of a drive into account in the case of a positive grade or a negative grade. It is taken into account in the respective dependency of the grade STEI of the grade characteristic STEI_KW, for example, how pronounced an increase of the reduction of the energy requirement is in the respective grade STEI. In this context, for example, the insight is exploited that, on a very steep downhill grade, a recuperation mode is not possible at optimum efficiency.

In a step S31, the respective route segment energy requirement characteristic ST_EB_KW is determined for the respective route segments STA, particularly taking the grade characteristic STEI_KW and the constant travel characteristic CONST_KW into account.

Furthermore, it is determined whether one or more dynamic events DYN_EV are associated with the respective route segment STA. This can be done, for example, on the basis of whether an expected speed change exceeds a predetermined speed change threshold within the route segment STA.

This can also be done, for example, on the basis of whether an expected speed change between two adjacent route segments STA exceeds a predetermined speed change threshold. The allocation of the dynamic event can be performed either to one of the adjacent route segments STA or distributed to both route segments STA.

If at least one dynamic event DYN_EV is associated with the route segment STA, the respective route segment energy requirement characteristic is determined for each dynamic event DYN_EV, also on the basis of a respective dynamic characteristic DYN_KW.

In a step S33, an estimated route energy requirement characteristic RT_EB_KW is then determined, particularly through summation of the individual estimated route segment energy requirement characteristic ST_EB_KW.

In a step S35, which can also be optionally provided, a warm-up correction value WL_COR is determined, particularly on the basis of a detected engine temperature T_MOT and optionally on the basis of the route length RT_L of the predetermined driving route RT. In this context, the dependency is particularly such that, for a route length RT_L that is greater than a predetermined threshold, the warm-up correction value WL_COR takes on a neutral value, and even at an engine temperature T_MOT greater than another threshold, it takes on a neutral value.

Furthermore, a vehicle load energy requirement characteristic FA_EB_KW can optionally be determined in step S35. This can be done, for example, on the basis of an estimated driving time FD_RT for the driving route RT and/or of an outside temperature TA. The vehicle loads can comprise, for example, an air conditioner and/or a heater.

In a step S37, the estimated route energy requirement characteristic RT_EB_KW is corrected on the basis of the warm-up correction value WL_COR and/or the vehicle load energy requirement characteristic FA_EB_KW. In a step S39, the program is ended.

Generally, during the determination of the estimated route segment energy requirement characteristic ST_EB_KW, the respective length of the route segment STA is taken into account.

Optionally, in a step S31, the constant travel characteristic CONST_KW to be allocated for the respective route segment STA can be determined on the basis of an expected average speed for the respective route segment STA. The expected average speed can be determined, for example, on the basis of historical data if the route segment has been driven previously. However, it can also be predetermined otherwise and associated, for example, in a fixed manner with the respective route segment STA or even be externally predeterminable, thus taking the time of day and/or the current traffic situation into account, for example. In this context, the constant travel characteristic CONST_KW is available for various speed classes.

In principle, when determining the respective route segment energy requirement, an interpolation can also be performed between adjacent constant characteristics of a respective speed class.

Moreover, when determining the estimated route segment energy requirement characteristic ST_EB_KW in relation to the constant travel characteristic CONST_KW, a respective factor FAC can also be taken into account for the respective speed class with which a corresponding characteristic value of the characteristic KL (FIG. 5) is multiplied, and the estimated route segment energy requirement characteristic ST_EB_KW is determined based on that.

Any interpolation can also be performed between two constant travel characteristics CONST_KW of adjacent speed classes.

A respective dynamic event is allocated if an expected change in speed exceeds a predetermined speed change threshold.

Moreover, the dynamic characteristic DYN_KW can be prepared in each case with respect to one of several predetermined speed change classes and determined in this way. In this context, it is then determined in the step S31 on the basis of an expected change in speed for the respective dynamic event DYN_EV. The expected change in speed can be determined, for example, on the basis of an expected turning angle; in doing so, the direction of the turning operation can also be considered, thus taking into account whether the turning operation is to the right or left. For example, an expected turning operation can be detected here when the turning angle exceeds a predetermined threshold by amount, which can be 30°, for example. As a result of coasting before turning and acceleration after turning, the energy consumption is reduced in the lead-up to the turn and increased afterward. Moreover, the expected turning angle can also be representative of curviness, and the expected change in speed can be determined in that respect.

Furthermore, the expected change in speed can be determined, for example, alternatively or additionally on the basis of a road intersection characteristic. The road intersection characteristic can be determined on the basis of road types of the intersecting roads and/or traffic signs at the respective intersection, such as a stop sign or a yield sign, and/or on the basis of the presence of a traffic light at the respective intersection as well.

The expected change in speed can be determined on the basis of a detected curve characteristic. The curve characteristic can be determined, for example, on the basis of information from the respective digital map.

In principle, a so-called map segment need not necessarily correspond to the respective route segments STA of the route. It can correspond, however. In principle, the respective estimated route energy requirement characteristic RT_EB_KW can be determined in this way for various driving routes between a predetermined starting point and destination point, and then the driving route can be outputted as the lowest-consumption driving route that has the lowest value for the estimated route energy requirement characteristic RT_EB_KW. The driving route RT selected in this way can be indicated, for example, on an output device 7 and/or, for example, compared to another route that has been optimized according to another quality criterion, such as a comfort mode consumption characteristic of a fast route.

In step S31, if dynamic characteristics DYN_KW exist for respective speed change classes, interpolation can also be performed according to the expected change in speed between commensurately adjacent dynamic characteristics DYN_KW.

Moreover, the driving route RT between the predetermined starting point and destination point can also be determined taking the expected energy requirement into account.

To do this, candidate route segments are first determined that are possible route segments STA for the route.

For each candidate route segment, it is determined whether one or more dynamic events DYN_EV are associated with it. For each candidate route segment, an estimated candidate route segment energy requirement characteristic is determined based on a respective constant travel characteristic that is associated with the respective candidate route segment and, if one or more dynamic events DYN_EV are associated with the respective candidate route segment, for each dynamic event DYN_EV based on a respective dynamic characteristic DYN_KW.

Depending on the estimated candidate segment energy requirement characteristics KST_EB_KW, the driving route RT is determined by selecting the candidate route segments KSTA. The selection can be done by means of a suitable method known to the person skilled in the art for these purposes, such as the Dijkstra algorithm.

The selection of the candidate route segments can also be done while taking an estimated segment driving time into account for the respective candidate route segment.

The selection of the candidate route segments can also be done by taking a vehicle load energy requirement characteristic into account, which is determined on the basis of an estimated driving time for the driving route RT and/or the outside temperature. In this way, influences resulting from the respective vehicle loads can be appropriately taken into account. For instance, a driving route can be selected that has more moderate outside temperatures, such as a coastal route instead of a desert route, thus yielding an overall lesser expected energy requirement.

The estimated candidate route segment energy requirement characteristic can be determined in a manner analogous to the route segment energy requirement characteristic ST_EB_KW.

The grade characteristic STEI_KW can also be learned, which is to say adapted. In this context, the grade characteristic STEI_KW is adapted in each case on the basis of at least one vehicle-specifically determined energy consumption characteristic EV_KW for a traveled route segment in which at least one predetermined grade was detected. Preferably, the grade is also adapted with respect to one of several respective grade class.

Figure 4A:
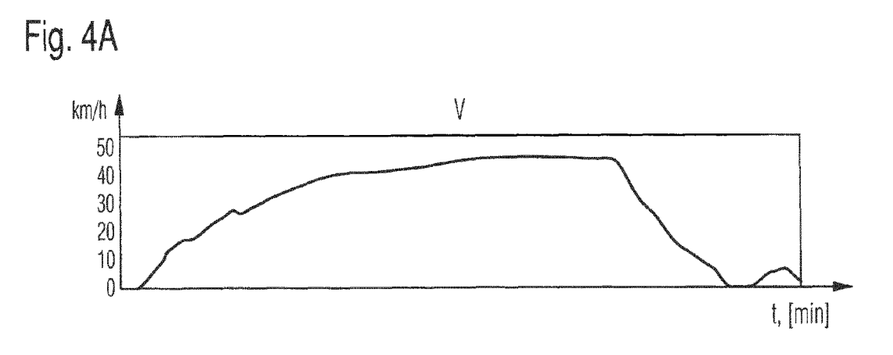
FIG. 4A to 4F are graphs illustrating curves for various variables plotted over the time t.
Figure 4B:
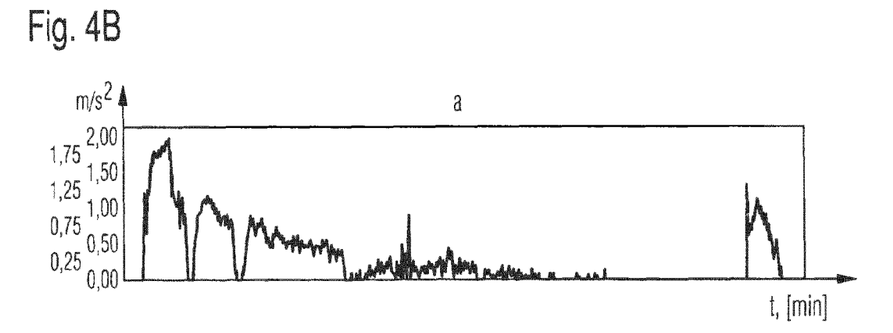
Figure 4C:
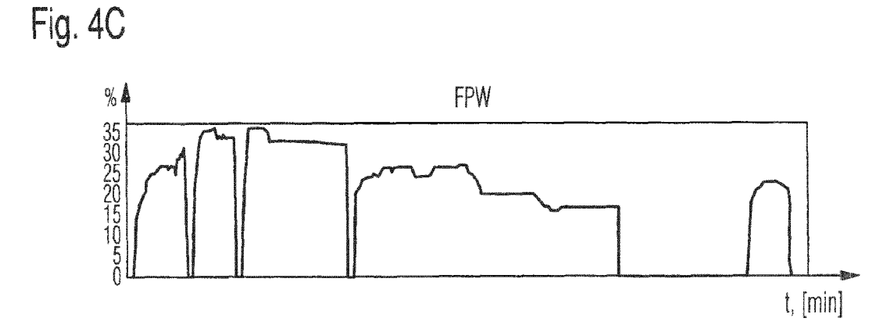
Figure 4D:
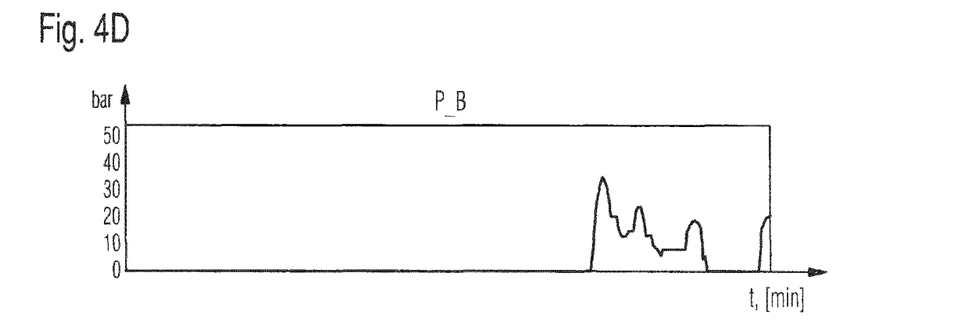
Figure 4E:
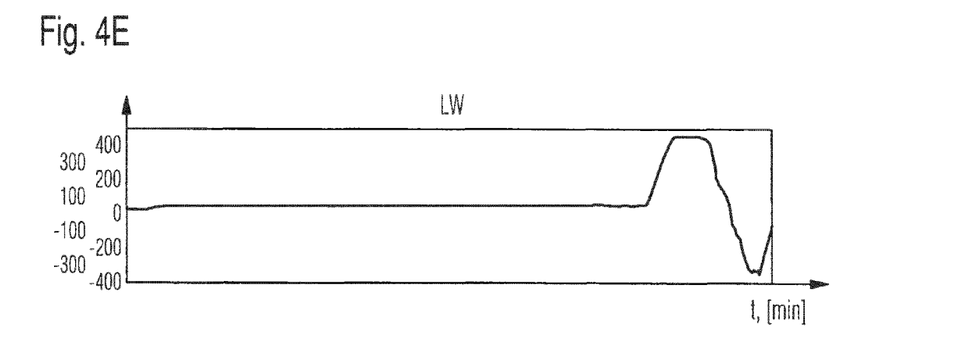
Figure 4F:
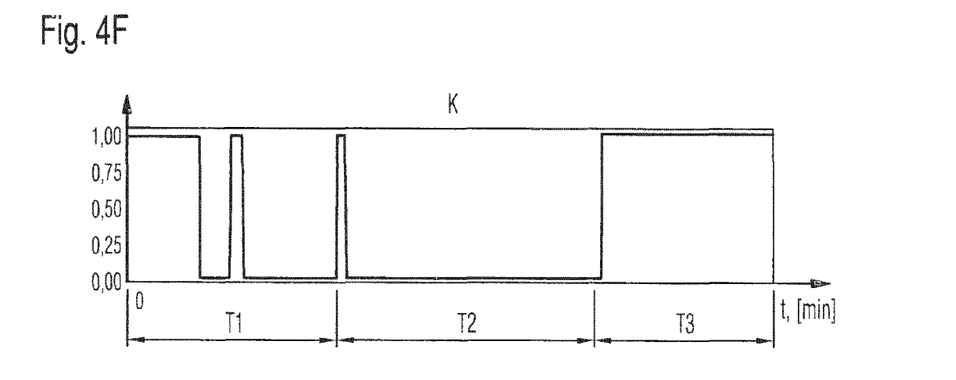

In FIGS. 4A to 4F, various progressions are plotted over time t on the same scale with respect to time t and the same time-segment. FIG. 4A shows the progression for speed, designated with v. FIG. 4B shows the progression for acceleration, designated with a. FIG. 4C shows the accelerator pedal value, designated with FPW. FIG. 4D shows the braking pressure, designated with P_B. FIG. 4E shows the steering angle, designated with LW, and FIG. 4F shows a coupling state K. On the basis of one or more of these variables, it is then detected whether constant travel mode or dynamic travel mode exists. For instance, during the time period T1, dynamic travel mode is detected, particularly a positive acceleration mode. During the time period T2, the constant travel mode is detected, and during time period T3, the dynamic travel mode is again detected with a negative acceleration mode.

LIST OF REFERENCE SYMBOLS

RT predetermined driving route
STA route segment
STEI_KW grade characteristic
STEI grade route segment
ST_EB_KW estimated route energy requirement characteristic
RT_EB_KW estimated route segment energy requirement characteristic
T_MOT engine temperature
RT_L route length
CONST_KW constant travel characteristic
DYN_KW dynamic characteristic
EV_KW vehicle-specifically detected energy consumption characteristic for a traveled route segment
CONST_STA constant travel segment
SYN_STA dynamic travel segment
ST_CONST segment length
ST_DYN segment length
COND_CONST predetermined condition for constant travel mode
COND_DYN predetermined condition for dynamic travel mode
WL_COR Warm-up correction value
t time
T2, T2, T3 time period
v velocity
a acceleration
FPW accelerator pedal value
P_B braking pressure
LW steering angle K coupling state
FAC factor
KL characteristic
FD_RT estimated driving time
TA outside temperature
1 navigation device
3 communication interface
5 input device
7 output device
9 speed sensor
11 steering angle sensor
13 braking pressure sensor
15 accelerator pedal sensor
17 Global Positioning System unit, GPS The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A navigation method for a vehicle, the method comprising the acts of:
   detecting at least one constant travel characteristic (CONST_KW) that is representative of a vehicle-specific energy requirement with respect to a predetermined trip length at quasi-constant speed on a quasi-level stretch;
   detecting at least one dynamic characteristic (DYN_KW) that is representative of a vehicle-specific energy requirement with respect to a predetermined trip length at a predetermined quasi-dynamic speed on a quasi-level stretch;
   respectively adapting the constant travel characteristic (CONST_KW) on the basis of at least one vehicle-specifically determined energy consumption characteristic (EV_KW) for a traveled route segment that was recognized as being quasi-level and in which a quasi-constant speed was detected;
   in order to determine an expected energy consumption for a predetermined driving route (RT) with several route segments (STA):
   (i) determining for each route segment (STA) whether one or more dynamic events are associated with the route segment,
   (ii) determining an estimated route segment energy requirement characteristic (ST_EB_KW) for each route segment (STA) on the basis of a respective constant travel characteristic (CONST_KW) that is associated with the respective route segment (STA), and if one or more dynamic events are associated with the respective route segment (STA), for each dynamic event on the basis of a respective dynamic characteristic (DYN_KW), and
   (iii) determining an estimated route energy requirement characteristic (RT_EB_KW) for the predetermined driving route (RT) on the basis of the respective route segment energy requirement characteristics (ST_EB_KW).

2. The navigation method according to claim 1, wherein the dynamic characteristic (DYN_KW) is respectively adapted on the basis of at least one vehicle-specifically determined energy consumption characteristic (EV_KW) for a traveled route segment in which at least one predetermined dynamic of speed was detected and the traveled route segment was recognized as being quasi-level.

3. A navigation method for a vehicle, the method comprising the acts of:
   detecting at least one constant travel characteristic (CONST_KW) that is representative of a vehicle-specific energy requirement with respect to a predetermined trip length at quasi-constant speed on a quasi-level stretch;
   detecting at least one dynamic characteristic (DYN_KW) that is representative of a vehicle-specific energy requirement with respect to a predetermined trip length at a predetermined quasi-dynamic speed on a quasi-level stretch;
   respectively adapting the constant travel characteristic (CONST_KW) on the basis of at least one vehicle-specifically determined energy consumption characteristic (EV_KW) for a traveled route segment that was recognized as being quasi-level and in which a quasi-constant speed was detected;
   in order to determine a driving route (RT) between a predetermined starting point and a predetermined destination point taking an expected energy requirement into account:
   (i) determining for each candidate route segment (KSTA) whether one or more dynamic events are associated with the candidate route segment,
   (ii) determining an estimated route segment energy requirement characteristic for each candidate route segment on the basis of a respective constant travel characteristic (CONST_KW) that is associated with the respective candidate route segment and, if one or more dynamic events are associated with the respective candidate route segment, for each dynamic event on the basis of a respective dynamic characteristic (DYN_KW), and
   (iii) determining the driving route (RT) by selecting the candidate route segments on the basis of the estimated candidate segment energy requirement characteristics.

4. The navigation method according to claim 3, wherein the dynamic characteristic (DYN_KW) is respectively adapted on the basis of at least one vehicle-specifically determined energy consumption characteristic (EV_KW) for a traveled route segment in which at least one predetermined dynamic of speed has been detected and the traveled route segment was recognized as being quasi-level.

5. The navigation method according to claim 3, wherein the driving route (RT) is determined by selecting the candidate route segments while taking an estimated segment driving time for the respective candidate route segments into account.

6. The navigation method according to claim 3, wherein the driving route (RT) is determined by selecting the candidate route segments while taking a vehicle load energy requirement characteristic into account that is determined on the basis of an estimated driving time for the driving route (RT).

7. The navigation method according to claim 1, wherein the estimated route energy requirement characteristic (RT_EB_KW) is determined on the basis of vehicle load energy requirement characteristic, which is determined on the basis of an estimated driving time for the driving route (RT).

8. The navigation method according to claim 7, wherein the vehicle load energy requirement characteristic is determined on the basis of a detected outside temperature.

9. The navigation method according to claim 6, wherein the vehicle load energy requirement characteristic is determined on the basis of a detected outside temperature.

10. The navigation method according to claim 1,
    wherein the constant travel characteristic (CONST_KW) is determined in each case with respect to one of several predetermined speed classes, the constant travel characteristic (CONST_KW) of a respective speed class being adapted to a respective speed class in the event of a speed that is within the speed class.

11. The navigation method according to claim 3, wherein the constant travel characteristic (CONST_KW) is determined in each case with respect to one of several predetermined speed classes, the constant travel characteristic (CONST_KW) of a respective speed class being adapted to a respective speed class in the event of a speed that is within the speed class.

12. The navigation method according to claim 2, wherein the dynamic characteristic (DYN_KW) is determined in each case with respect to one of several predetermined speed change classes, the dynamic characteristic (DYN_KW) being adapted in each case to a respective speed change class in the event of a speed change that is within the speed class.

13. The navigation method according to claim 4, wherein the dynamic characteristic (DYN_KW) is determined in each case with respect to one of several predetermined speed change classes, the dynamic characteristic (DYN_KW) being adapted in each case to a respective speed change class in the event of a speed change that is within the speed class.

14. The navigation method according to claim 2, wherein the dynamic characteristic (DYN_KW) is adapted and determined separately in each case for a positive and a negative acceleration, the dynamic characteristic (DYN_KW) being adapted in each case for the positive or negative acceleration in the event of positive or negative acceleration.

15. The navigation method according to claim 4, wherein the dynamic characteristic (DYN_KW) is adapted and determined separately in each case for a positive and a negative acceleration, the dynamic characteristic (DYN_KW) being adapted in each case for the positive or negative acceleration in the event of positive or negative acceleration.

16. The navigation method according to claim 2, wherein the dynamic characteristic (DYN_KW) is adapted on the basis of the respective constant travel characteristic (CONST_KW) to the respective speed class under which an average speed expected for the route segment falls.

17. The navigation method according to claim 4, wherein the dynamic characteristic (DYN_KW) is adapted on the basis of the respective constant travel characteristic (CONST_KW) to the respective speed class under which an average speed expected for the route segment falls.

18. The navigation method according to claim 1, wherein the constant travel characteristic (CONST_KW) and/or the dynamic characteristic (DYN_KW) is adapted and determined in a driver-specific manner.

19. The navigation method according to claim 3, wherein the constant travel characteristic (CONST_KW) and/or the dynamic characteristic (DYN_KW) is adapted and determined in a driver-specific manner.

20. The navigation method according to claim 1, wherein a factor (FAC) is respectively determined and adapted to adapt to a predetermined characteristic (KL) that represents a relationship between speed and energy requirement for the respective speed class.

21. The navigation method according to claim 3, wherein a factor (FAC) is respectively determined and adapted to adapt to a predetermined characteristic (KL) that represents a relationship between speed and energy requirement for the respective speed class.

22. The navigation method according to claim 1, wherein the detection of the dynamic characteristic is performed on the basis of a detected change in speed, a detected steering angle (LW), a detected braking pressure (P_B) and/or an accelerator pedal position (FPW).

23. The navigation method according to claim 3, wherein the detection of the dynamic characteristic is performed on the basis of a detected change in speed, a detected steering angle (LW), a detected braking pressure (P_B) and/or an accelerator pedal position (FPW).

24. The navigation method according to claim 1, wherein the constant travel characteristic (CONST_KW) associated with the respective route segment (STA) is determined on the basis of an expected average speed for the respective route segment (STA).

25. The navigation method according to claim 3, wherein the constant travel characteristic (CONST_KW) associated with the respective candidate route segment (KSTA) is determined on the basis of an expected average speed for the respective candidate route segment (KSTA).

26. The navigation method according to claim 1, wherein a respective dynamic event is allocated if an expected change in speed exceeds a predetermined speed change threshold, and
wherein the dynamic characteristic (DYN_KW) associated with the respective dynamic event is determined on the basis of an expected change in speed during the respective dynamic event.

27. The navigation method according to claim 26, wherein the expected change in speed is determined on the basis of an expected turning angle.

28. The navigation method according to claim 26, wherein the expected change in speed is determined on the basis of a road intersection characteristic.

29. The navigation method according to claim 28, wherein road intersection characteristic is determined on the basis of road types of the intersecting roads, road signs at the respective intersection and/or the presence of a traffic light at the respective intersection.

30. The navigation method according to claim 26, wherein the expected change in speed is determined on the basis of a detected curve characteristic.

31. The navigation method according to claim 1, wherein a grade characteristic (STEI_KW) is determined for each route segment (STA) that is representative of a grade-dependent adaptation of the energy requirement of the vehicle as a function of a predetermined grade (STEI) for the route segment (STA), and
the estimated route segment energy requirement characteristic (ST_EB_KW) being determined for each route segment (STA) taking the respective grade characteristic (STEI_KW) into account.

32. The navigation method according to claim 3, wherein a grade characteristic (STEI_KW) is determined for each candidate route segment (KSTA) that is representative of a grade-dependent adaptation of the energy requirement of the vehicle on the basis of a predetermined grade (STEI) for the candidate route segment (KSTA), and
the estimated candidate route segment energy requirement characteristic (ST_EB_KW) being determined for each candidate route segment (KSTA) taking the respective grade characteristic (STEI_KW) into account.

33. The navigation method according to claim 31, wherein the grade characteristic (STEI_KW) is respectively adapted on the basis of at least one vehicle-specifically determined energy consumption characteristic (EV_KW) for a traveled route segment that has been recognized as having at least one predetermined grade.

34. The navigation method according to claim 32, wherein the grade characteristic (STEI_KW) is respectively adapted on the basis of at least one vehicle-specifically determined energy consumption characteristic (EV_KW) for a traveled route segment that has been recognized as having at least one predetermined grade.

35. The navigation method according to claim 1,
wherein the estimated route energy requirement characteristic (RT_EB_KW) is corrected for the predetermined driving route (RT) on the basis of an engine temperature (T_MOT) and a trip length (RT_L).

* * * * *